Nov. 17, 1931.    J. M. G. FULLMAN    1,831,855
FITTING FOR UNDERFLOOR DUCT SYSTEMS
Filed July 13, 1929
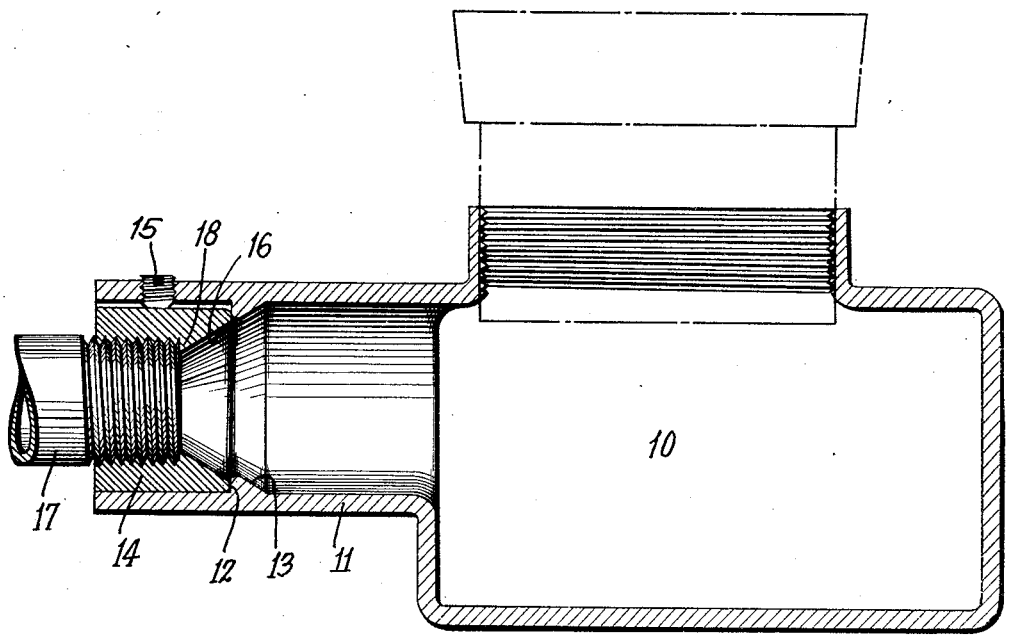
Inventor
James M. G. Fullman
By his Attorney
Cooper, Kerr & Dunham Patented Nov. 17, 1931

1,831,855

UNITED STATES PATENT OFFICE

JAMES M. G. FULLMAN, OF SEWICKLEY, PENNSYLVANIA, ASSIGNOR TO NATIONAL ELECTRIC PRODUCTS CORPORATION, OF NEW YORK, N. Y., A CORPORATION OF DELAWARE

FITTING FOR UNDERFLOOR DUCT SYSTEMS

Application filed July 13, 1929. Serial No. 378,050.

This invention relates to improvements in fittings used in underfloor duct systems for electrical wiring installations. With such underfloor conduit or duct systems, frequently the junction boxes, outlet boxes or outlet fittings, are provided with long passages into which a duct or conduit is intended to be received. Occasion frequently arises for utilizing smaller sized conduits than the passage is intended to receive and under such conditions reducing bushings have been used in the passages. Such reducing bushings while serving to permit the use of small sized ducts or conduits present an objectionable shoulder which makes it difficult to draw or fish the wires through the cooperating parts and conduits.

One object of the present invention resides in the provision of an improved form of reducing bushing which is particularly adapted for use in conduit systems and which has a special configuration to facilitate drawing of the wires and cables from a passage having a relatively large cross section into a conduit or duct having a smaller interior cross sectional area.

Another object of the present invention resides in the provision of an outlet or junction box part with a passage provided with a tapered shoulder portion which is adapted to direct a wire or cable either into the interior of a cooperating duct or to the passage through an inserted reducing bushing.

Further and other objects will be hereinafter set forth in the accompanying specification and claims and shown in the drawing, which by way of illustration shows a preferred embodiment of the invention.

The drawing shows an outlet fitting and reducing bushing incorporating the present invention.

In the drawing, 10 is a floor junction box or outlet fitting provided with a neck-like extension 11 which forms a female coupling for the reception of a section of a conduit or duct. In the event that a full sized duct or conduit was used, such duct or conduit would be entered into the coupling to a sufficient extent to abut at the ends against the shoulder 12 so that the tapered portion 13 of the shoulder would serve as an incline to guide a cable or wire from the interior of the fitting into the interior of the duct. In the event that it is desired to use smaller sized ducts, a reducing fitting or bushing 14 is introduced and retained in abutting relation with the shoulder in any suitable way as by set screw 15. The reducing bushing is likewise provided with a tapered or inclined portion 16 which is adapted to direct a fish wire or cable when being drawn or pushed up into the interior of the smaller sized conduit 17. As shown the reducing bushing 14 is provided with a shoulder 18 against which the end of conduit 17 may abut. It will be understood that the female coupling portion of the neck 11 is provided with a cylindrically shaped bored out portion and that the exterior of the bushing 14 is also similarly cylindrically shaped so that either the bushing 14 or a conduit with a corresponding cylindrical exterior may be interchangeably received by the fitting.

It will be appreciated that various sized reducing bushings or fittings may be employed according to the size of small conduits or ducts which are to be used.

By providing the inclined portion 13 on the fitting 10 and the inclined portion 16 upon the reducing bushing 14 the insertion of the fish wire or of the cable or wire or both into the conduit from the outlet box opening is facilitated since the inserted fish wire or cable will readily slide up the inclined or conical surfaces.

What I claim is:

1. An outlet fitting provided with a neck-like extension to form a female coupling, said extension being provided with a shouldered portion and with a tapered portion leading to the top of such shoulder to facilitate the introduction of a wire into a part which is introduced into the female coupling and a bushing received within said neck-like extension and arranged to abut the shouldered portion and an opening to receive and secure a conduit therein, said bushing also having a tapered portion generally conforming with the previously mentioned tapered portion for guiding a wire into the conduit and within said bushing.

2. An outlet fitting for an underfloor system, which includes in combination, a reducing bushing having a smooth cylindrical exterior portion and a female coupling portion on said fitting, said female coupling portion having a smooth cylindrical bore portion adapted to alternatively receive a conduit having a smooth cylindrical exterior or the said reducing bushing, said fitting furthermore including a shouldered portion serving as an abutment for an inserted conduit or for the inserted bushing, said fitting furthermore having a tapered portion therein leading to said shouldered portion to guide a wire into the interior of the conduit or to an opening in the reducing bushing, and a common clamping means carried by the fitting for clamping either the reducing bushing or the conduit in the female coupling portion of the fitting.

3. A reducing bushing having an external cylindrically shaped portion adapted for insertion in the cylindrical bore of a fitting which is adapted to receive a cylindrically shaped conduit also in said bore, said bushing having a relatively smaller conduit receiving opening at one end and being provided with a tapered portion which extends from a point adjacent the other end of the bushing to the relatively smaller conduit receiving opening for the purpose described.

4. A reducing bushing for an underfloor duct system having a cylindrical exterior portion to interchangeably fit with a conduit having the same dimensions and exterior cylindrical contour within the cylindrical bore of a female coupling of a fitting, said bushing also having a shouldered portion against which a conduit inserted in the bushing is adapted to abut, said bushing also having a tapered portion leading from the end which is innermost when the bushing is within the coupling to the aforesaid shouldered portion for the purpose described.

5. An underfloor duct system fitting comprising a neck portion having a cylindrically shaped bored out portion serving as a female coupling for either an inserted cylindrical conduit or for an inserted reducing bushing which has the same exterior cylindrical contour as that of the conduit which it replaces, said fitting also having a shouldered portion to provide an arresting abutment for either the inserted bushing or for the end of the conduit, said fitting having a tapered portion leading up to the interior of the fitting to the aforesaid shoulder, and a reducing bushing having a cylindrically shaped outer portion to fit the cylindrical bore of the fitting, said bushing having a shoulder at one end to abut the aforesaid shoulder on the fitting, and said bushing having a tapered portion leading from the exterior of the bushing from said shoulder.

In testimony whereof I hereto affix my signature.

JAMES M. G. FULLMAN.